(12) United States Patent
Yu et al.

(10) Patent No.: US 8,786,760 B2
(45) Date of Patent: Jul. 22, 2014

(54) DIGITAL PHOTOGRAPHING APPARATUS AND METHOD USING FACE RECOGNITION FUNCTION

(75) Inventors: Hyun-sik Yu, Seongnam-si (KR); Sang-ryoon Son, Seongnam-si (KR); Byeong-chan Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 618 days.

(21) Appl. No.: 12/221,727

(22) Filed: Aug. 6, 2008

(65) Prior Publication Data

US 2009/0059061 A1 Mar. 5, 2009

(30) Foreign Application Priority Data

Aug. 30, 2007 (KR) ........................ 10-2007-0087708

(51) Int. Cl.
*G03B 13/00* (2006.01)
*G06K 9/00* (2006.01)

(52) U.S. Cl.
USPC .......................................... 348/345; 382/118

(58) Field of Classification Search
USPC ........... 348/347, 345; 382/107, 103, 118, 254
See application file for complete search history.

(56) References Cited

U.S. PATENT DOCUMENTS

| | | | |
|---|---|---|---|
| 7,362,368 B2 * | 4/2008 | Steinberg et al. | 348/349 |
| 7,526,193 B2 | 4/2009 | Minato et al. | |
| 2003/0053664 A1 | 3/2003 | Pavlidis et al. | |
| 2003/0071908 A1 * | 4/2003 | Sannoh et al. | 348/345 |
| 2007/0064145 A1 * | 3/2007 | Sugimoto | 348/345 |
| 2007/0110305 A1 * | 5/2007 | Corcoran et al. | 382/167 |
| 2007/0201726 A1 * | 8/2007 | Steinberg et al. | 382/103 |
| 2007/0286590 A1 | 12/2007 | Terashima | |
| 2008/0136958 A1 * | 6/2008 | Nakahara | 348/345 |

FOREIGN PATENT DOCUMENTS

| | | |
|---|---|---|
| CN | 1585957 A | 2/2005 |
| EP | 1 128 316 A1 | 8/2001 |
| JP | 07-318785 A | 12/1995 |
| JP | 2001-148800 A | 5/2001 |
| JP | 2005-086682 A | 3/2005 |
| JP | 2006-116706 A | 5/2006 |
| JP | 2007-329784 A | 12/2007 |
| JP | 2008-299164 A | 12/2008 |

(Continued)

OTHER PUBLICATIONS

Baguley, "Fuji FinePix S6000fd Digital Camera Review," Washington Post, downloaded from Internet site: http://reviews.washingtonpost.com/product/Fuji/S6000fd.htm (Dec. 11, 2006).

(Continued)

*Primary Examiner* — Mekonnen Dagnew
(74) *Attorney, Agent, or Firm* — Drinker Biddle & Reath LLP (57) ABSTRACT

A digital photographing apparatus and method using a face recognition function for obtaining an image in which a plurality of faces are focused by setting AF areas in the plurality of recognized faces and photographing the faces in a bracket mode based on the set AF areas. The digital photographing apparatus includes: a face recognition unit detecting face information from a real image; an AF region setting unit setting a plurality of AF areas based on the detected face information; and a control unit operating so that an image is captured by adjusting focuses of the set plurality of AF areas.

21 Claims, 7 Drawing Sheets

(56) References Cited

FOREIGN PATENT DOCUMENTS

| | | |
|---|---|---|
| KR | 1020070001817 A | 1/2007 |
| KR | 10-2007-0109843 A | 11/2007 |
| WO | WO 2007/052572 A1 | 5/2007 |

OTHER PUBLICATIONS

FujiFilm's Face Detection Technology a Cure for "Picture Phobia", Internet Publication, downloaded from Internet site: http://www.creativepro.com/article/fujifim-s-face-detection-techology-a-cure-for-picture-phobia- (Nov. 12, 2006).

Office Action established for CN 200810144710.6 (Aug. 10, 2011).
Examination Report established for GB 0811842.4 (Oct. 3, 2011).
Search and Examination Report established for GB 1212186.9 (Sep. 28, 2012).
Office Action established for CN 200810144710.6 (Nov. 29, 2012).
Examination Report established for GB 0811842.4 (May 8, 2012).
Office Action established for CN 200810144710.6 (May 28, 2012).
Office Action established for CN 200810144710.6 (Jun. 7, 2013).
Office Action established for KR 10-2007-0087708 (Aug. 26, 2013).
Office Action issued for CN 200810144710.6 (Dec. 12, 2013).
Office Action issued for KR 10-2007-0087708 (Dec. 18, 2013).
Notice of Allowance issued for KR 10-2007-0087708 (May 26, 2014).

* cited by examiner

DIGITAL PHOTOGRAPHING APPARATUS AND METHOD USING FACE RECOGNITION FUNCTION

CROSS-REFERENCE TO RELATED PATENT APPLICATION

This application claims the benefit of Korean Patent Application No. 10-2007-0087708, filed on Aug. 30, 2007, in the Korean Intellectual Property Office, the disclosure of which is incorporated herein in its entirety by reference.

BACKGROUND OF THE INVENTION

1. Field of the Invention

The present invention relates to a digital photographing apparatus and method, and more particularly, to a digital photographing apparatus and method using a face recognition function for obtaining an image in which all faces are focused by setting AF areas in a plurality of recognized faces and photographing the faces in a bracket mode based on the set AF areas.

2. Description of the Related Art

A face recognition auto focusing (AF) function serves to search for face areas and to set AF windows for the face areas so as to focus on persons to be photographed. The face recognition AF function is used in most digital photographing apparatuses.

In addition, an AF bracket function for further taking three to five images by changing AF steps so as to improve the performance of the AF function is embodied in a high quality digital photographing apparatus. A photographing process with respect to a plurality of focusing points in an AF bracket mode is disclosed in Japanese Unexamined Patent Application Publication No. 2006-116706.

Figure 1A:
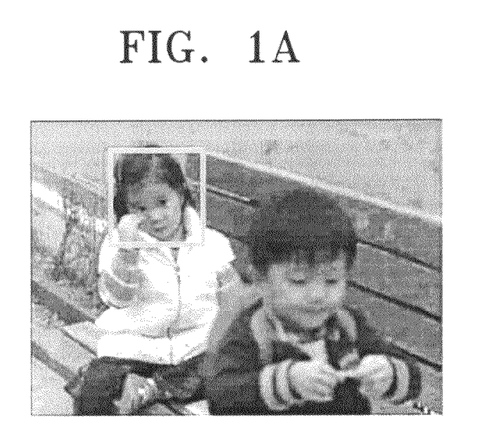
FIGS. 1A and 1B are photographs including a plurality of faces taken by a conventional digital photographing apparatus in an AF mode.
Figure 1B:
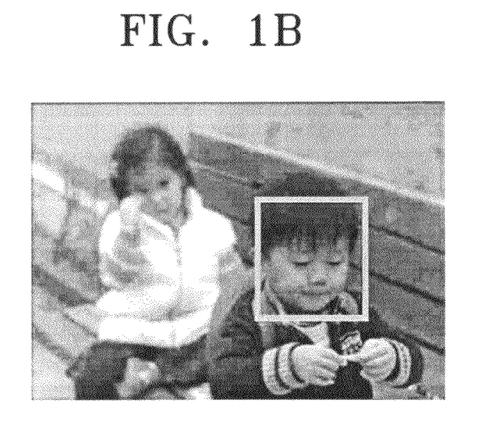

In a conventional digital photographing apparatus, since the face recognition AF function serves to primarily focus one face even if an image includes multiple faces, when people are separated at a distance from one another as shown in FIGS. 1A and 1B, the problem is that only one face and not the other faces is in focus. Although some digital photographing apparatuses include an AF bracket function, the AF bracket function serves not to focus on faces of multiple people but instead serves to indicate an error if multiple faces are present.

Figure 2:
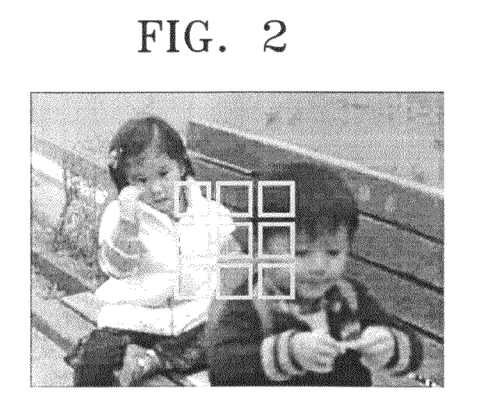
FIG. 2 is a photograph taken by a conventional digital photographing apparatus in an AF bracket mode.

In addition, as shown in FIG. 2, a technique for capturing an image with a plurality of predetermined focus areas has been developed. However, in some cases, the faces of subjects may not fall within any of the predetermined focus areas, and therefore, these faces will not be in focus when captured in a photograph. In other words, since the subjects are photographed in a bracket mode having AF areas at predetermined or fixed positions, it is nearly impossible to obtain an image in which all of the faces in an image are focused.

After taking pictures, pictures are frequently distributed to people appearing therein, and sometimes people are unhappy or are unsatisfied when they view themselves in pictures in which their respective faces are out of focus. Accordingly, a technique for focusing a plurality of faces is required.

SUMMARY OF THE INVENTION

The present invention provides digital photographing apparatus and method using a face recognition function for obtaining an image in which multiple faces are focused by setting AF areas corresponding to a plurality of recognized faces and photographing the faces in a bracket mode based on the AF areas.

According to an aspect of the present invention, there is provided a digital photographing apparatus using a face recognition function, the digital photographing apparatus comprising: a face recognition unit detecting face information from a real image; an AF region setting unit setting a plurality of AF areas based on the detected face information; and a control unit operating so that an image is captured by adjusting focuses of the set plurality of AF areas.

According to another aspect of the present invention, there is provided a digital photographing apparatus using a face recognition function, the digital photographing apparatus comprising: a face recognition unit detecting the number of faces from a live screen image; an AF area setting unit setting AF areas of which the number is the same as the detected number of the faces; and a control unit operating so as to capture an image by adjusting focuses of which the number is the same as that of the set AF areas in response to an input of a shutter signal.

According to another aspect of the present invention, there is provided a digital photographing apparatus using a face recognition function, the digital photographing apparatus comprising: a face recognition unit detecting face information from a live screen image; an AF area setting unit setting faces having similar distances between eyebrows to AF areas belonging to the same group based on the detected face information; and a control unit operating so as to capture an image by adjusting focuses of which the number is the same as that of groups in response to an input of a shutter signal.

According to another aspect of the present invention, there is provided a digital photographing apparatus using a face recognition function, the digital photographing apparatus comprising: a face recognition unit detecting face information from a live screen image; an AF area setting unit setting AF areas of which the number is the same as the detected number of the faces; a range finding unit measuring a distance between each face and the digital photographing apparatus based on the detected number of faces; and a control unit operating so as to set faces having similar measured distances to AF areas belonging to the same group in order to capture an image by adjusting focuses of which the number is the same as that of groups in response to an input of a shutter signal.

According to an aspect of the present invention, there is provided a method of operating a digital photographing apparatus using a face recognition function, the method comprising: (a) detecting face information from a real image; (b) setting a plurality of AF areas based on the detected face information; and (c) capturing an image by adjusting focuses of the set plurality of AF areas.

According to another aspect of the present invention, there is provided a method of operating a digital photographing apparatus using a face recognition function, the method comprising: (a) detecting the number of faces from a real image; (b) setting AF areas of which the number is the same as the detected number of faces; and (c) capturing an image by adjusting focuses of which the number is the same as that of the set AF areas in response to an input of a shutter signal.

According to another aspect of the present invention, there is provided a method of operating a digital photographing apparatus using a face recognition function, the method comprising: (a) detecting positions of faces from a live screen image; (b) setting faces having similar distances between eyebrows to AF areas belonging to the same group based on the detected face information; and (c) capturing an image by adjusting focuses of which the number is the same as that of groups in response to an input of a shutter signal.

According to another aspect of the present invention, there is provided a method of operating a digital photographing apparatus using a face recognition function, the method comprising: (a) detecting the number of faces from a real image; (b) setting AF areas of which the number is the same as the detected number of faces; (c) measuring a distance between each face and the digital photographing apparatus based on the detected number of faces; (d) setting faces having similar measured distances to AF areas belonging to the same group; and (e) capturing an image by adjusting focuses of which the number is the same as that of groups in response to an input of a shutter signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 3:
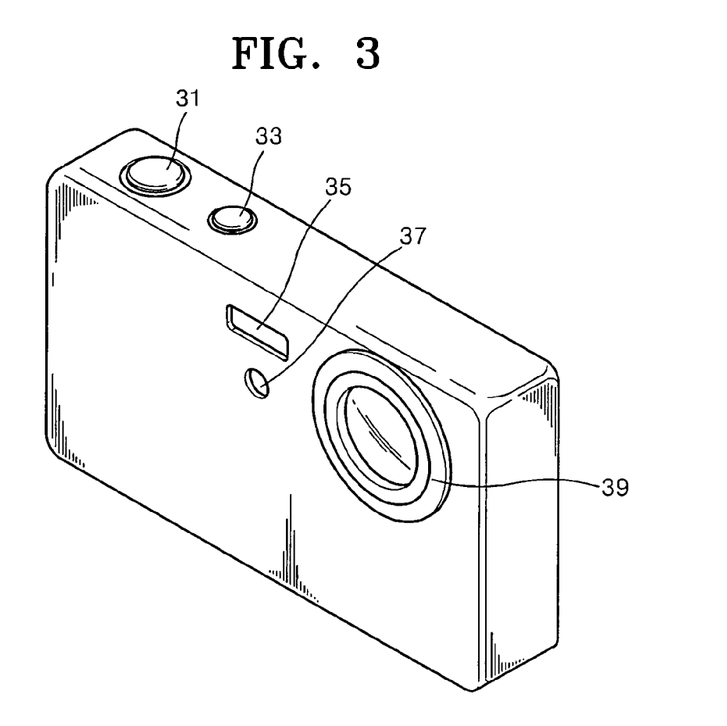
FIG. 3 is a perspective view illustrating an embodiment of the digital photographing apparatus of the present invention.

FIG. 3 is a perspective view illustrating a digital photographing apparatus according to an embodiment of the present invention.

Referring to FIG. 3, the digital image processing apparatus includes a shutter-release button 31, a power button 33, a flash 35, an auxiliary light source 37, and a lens unit 39. When the power button 33 is pressed, power is supplied to the digital image processing apparatus so that the digital image processing apparatus can operate. In this state, when the shutter-release button 31 is pressed, a charge-coupled device (CCD) (not shown) is exposed to light for a predetermined time via an iris diaphragm (not shown) and the lens unit 39 so that an image to be photographed is recorded in the CCD.

When the shutter-release button 31 is operated by a user, first and second photographing signals are generated. When the shutter-release button 31 is half-pressed, a first shutter-release signal is generated, and the digital photographing apparatus performs focusing and controls an amount of light entering the lens unit 39. When focusing on a desired view is achieved, a green light lights up on a display unit 43 (see FIG. 4). When the shutter-release button 31 is further fully-pressed, after focusing is achieved and the amount of light is controlled, a second shutter-release signal is generated and an image is taken.

The flash 35 serves to illuminate an image to be photographed in a dark place. Flash modes include an automatic mode, a forced flash mode, a flash-off mode, a red-eye reduction mode, and a slow-sync flash mode.

The auxiliary light source 37 serves to supply light to a subject to be photographed so as to enable the digital photographing apparatus to automatically and accurately perform focusing when photographing takes place in dark conditions.

The lens unit 39 processes an image by receiving light bouncing off the subject.

Figure 4:
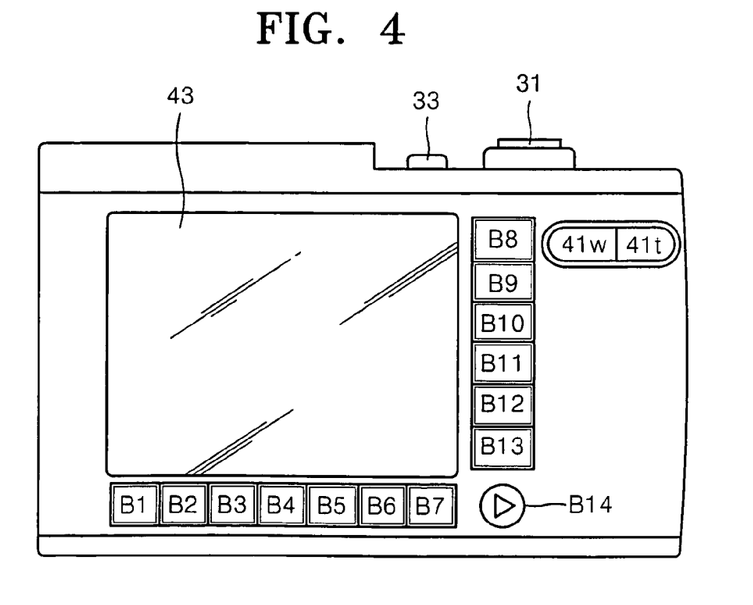
FIG. 4 is a rear elevation view illustrating the digital photographing apparatus shown in FIG. 3.

FIG. 4 is a rear elevation view illustrating the digital photographing apparatus shown in FIG. 3. The rear side of the digital photographing apparatus includes an optical angle-zoom button 41w, a telescopic-zoom button 41t, the display unit 43, and input buttons B1 to B14, each including a touch sensor or contact point switch (hereinafter, referred to as buttons B1 to B14).

When the optical angle-zoom button 41w or the telescopic-zoom button 41t is pressed, a view angle is widened or narrowed. The optical angle-zoom button 41w or the telescopic-zoom button 41t is pressed so as to change a size of a selected area. When the optical angle-zoom button 41w is pressed, the size of the selected area is decreased. When the telescopic-zoom button 41t is pressed, the size of the selected exposed area is increased.

The buttons B1 to B14 are arranged in a row and a column next to the display unit 43. Each of the buttons B1 and B14 includes a touch sensor (not shown) or a contact point switch (not shown).

That is, when each of the buttons B1 to B14 include a touch sensor, it is possible to select any value from among main menu items or activate sub-menu icon included in a main menu icon by moving a cursor in up/down/left/right directions by touching each of the buttons B1 to B14.

In addition, when each of the buttons B1 to B14 includes a contact point switch, it is possible to directly select a main menu icon and a sub-menu icon and execute a function thereof by switching each of the buttons B1 to B14. The contact point switch requires a relatively strong touch as compared with the touch sensor.

Figure 5:
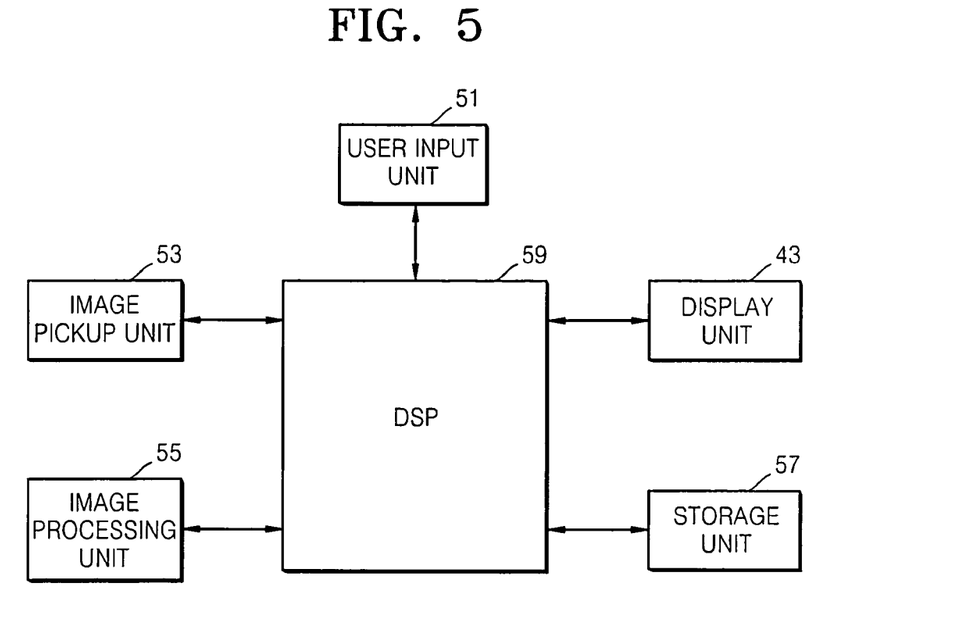
FIG. 5 is a block diagram illustrating the digital photographing apparatus of FIGS. 3 and 4.

FIG. 5 is a block diagram illustrating the digital photographing apparatus FIGS. 3 and 4, according to an embodiment of the present invention. The digital photographing apparatus includes the display unit 43, a user input unit 51, an image pickup unit 53, an image processing unit 55, a storage unit 57, and a digital signal processing unit 59.

The user input unit 51 includes the shutter release button 31, the power button 33, the optical angle-zoom button 41w and the telescopic-zoom button 41t, and the buttons B1 to B14.

The image pickup unit 53 includes a shutter, the lens unit 39, a diaphragm, the charge coupled device (CCD), and an analog-to-digital converter (ADC), which are not shown in the drawings. The shutter together with the diaphragm serves to control the amount of light. The lens unit 39 processes the image by receiving light bouncing off the subject to be photographed. At this time, the diaphragm controls the amount of incident light based on the degree of opening of the diaphragm. The degree of opening of the diaphragm is controlled by the digital signal processing unit 59.

The CCD accumulates light that is input through the lens unit 39 and outputs the image taken by the lens unit 39 based on the accumulated light in response to a vertical synchronization signal. The CCD converts light bouncing off the subject into an electrical signal. In order to obtain a color image by using the CCD, a color filter is included in the digital image processing apparatus of the present invention. The color filter may be a color filter array (CFA). The CFA has a regularly arrayed structure in which only monochromatic light passes through each pixel. The CFA can have various shapes based on the structure of the array. The ADC converts an analog image signal that is output from the CCD into a digital signal.

The image processing unit 55 processes the image signal converted into the electrical signal so as to be displayable. The image processing unit 55 removes black levels caused by dark current and performs a gamma correction process for coding an input image signal based on non-linear eyesight of people. In addition, the image processing unit 55 performs a CFA interpolation process for interpolating a Bayer pattern, including RGRG lines and GBGB lines of predetermined data obtained by performing the gamma correction process, into an RGB line, converts the interpolated RGB signal into a YUV signal, performs an edge compensation process for processing an image by filtering a Y signal through a high pass filter, performs a color correction process for correcting a color value of U and V signals by using a standard color coordinate system, and removes noise thereof. Then, the image processing unit 55 compresses and processes Y, U, and V signals obtained by removing noise so as to generate a JPEG file. The generated JPEG file is displayed on the display unit 43 and stored in the storage unit 57. All the operations of the image processing unit 55 are controlled by the digital signal processing unit 59.

The digital signal processing unit 59 sets AF areas (focus areas) in a plurality of faces recognized in the face recognition process, takes photographs in a bracket mode based on the set AF areas, and allows that an image in which all faces are focused on is obtained. Accordingly, the digital signal processing unit 59 is embodied according to a number of embodiments of the present invention.

The digital signal processing unit 59 according to an embodiment detects the number of faces and positions of the faces from a real image and sets AF areas of which the number is the same as that of the detected faces. The digital signal processing unit 59 allows an image to be captured by adjusting focuses of which the number is the same as that of AF areas in response to an input of a shutter signal.

The digital signal processing unit 59 according to another embodiment detects the number of faces and positions of the faces from the real image and sets faces having similar distances between eyebrows to AF areas of the same group. Each AF area group includes an AF area corresponding to one or more faces. The digital signal processing unit 59 allows an image to be captured by adjusting focuses of which the number is the same as that of the set groups in response to an input of a shutter signal.

The digital signal processing unit 59 according to other embodiment detects the number of faces and positions of the faces from the real image, sets AF areas of which the number is the same as that of the detected faces, measures distances between faces and the digital photographing apparatus based on the number of detected faces, and sets faces having similar measured distances to AF areas of the same group. The digital signal processing unit 59 allows an image to be captured by adjusting focuses of which the number is the same as the set groups in response to an input of a shutter signal.

Figure 6:
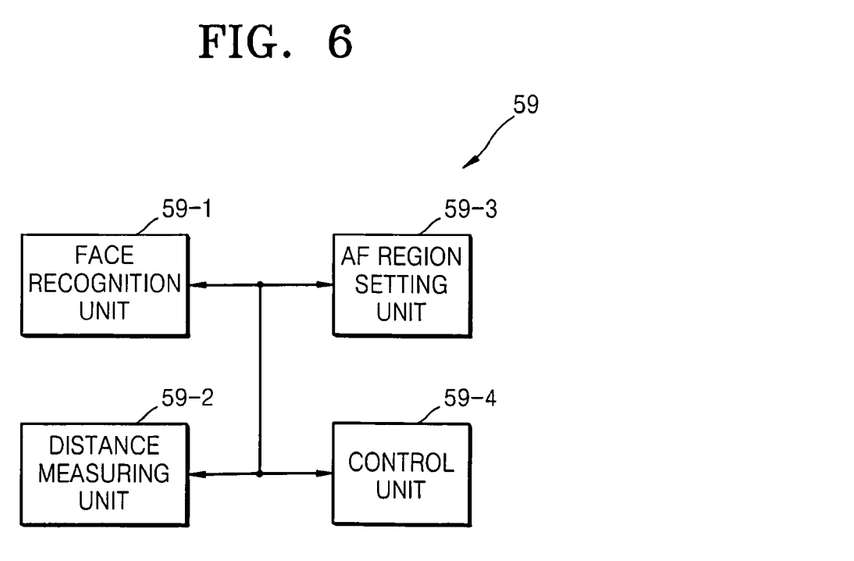
FIG. 6 is a detailed block diagram illustrating a digital signal processing unit of the digital photographing apparatus according to first to third embodiments of the present invention.

FIG. 6 is a detailed block diagram illustrating the digital signal processing unit 59 of the digital photographing apparatus according to an embodiment. The digital signal processing unit 59 includes a face recognition unit 59-1, an AF area setting unit 59-3, a range finding unit 59-2, and a control unit 59-4.

In an embodiment, the face recognition unit 59-1 detects face information such as the number of faces, positions of the faces, and the like in the display unit 43 from a real image to be taken. In the digital photographing apparatus, when the first shutter-release signal is input by pressing the shutter-release button 31, the face recognition process may be performed. If the digital photographing apparatus is set in a mode for photographing a face, even when the first shutter-release button 31 is not input, it is possible to perform the face recognition process in the real image.

In order to detect face information, the face recognition unit 59-1 searches for invariable characteristics such as face components including eyes, nose, and mouth, texture, and skin color through a characteristic-based face detection method. Particularly, since the skin color is less sensitive to movement, rotation, and a change of the face size, the skin color is generally used among various characteristics. The face recognition unit 59-1 generates and stores several standard patterns on a face so as be used to detect a face through a face template-based detection method. The patterns are compared with images one by one in an image search window, and a face is detected. Recently, support vector machine (SVM) based face detection methods are frequently used. In the SVM-based methods, face parts and non-face parts are learned by a learning device by sub-sampling different areas from an image, and a face is searched for in the input image.

The face recognition unit 59-1 detects face information such as the number of faces and positions of the faces and outputs the face information to the control unit 59-4.

Figure 7:
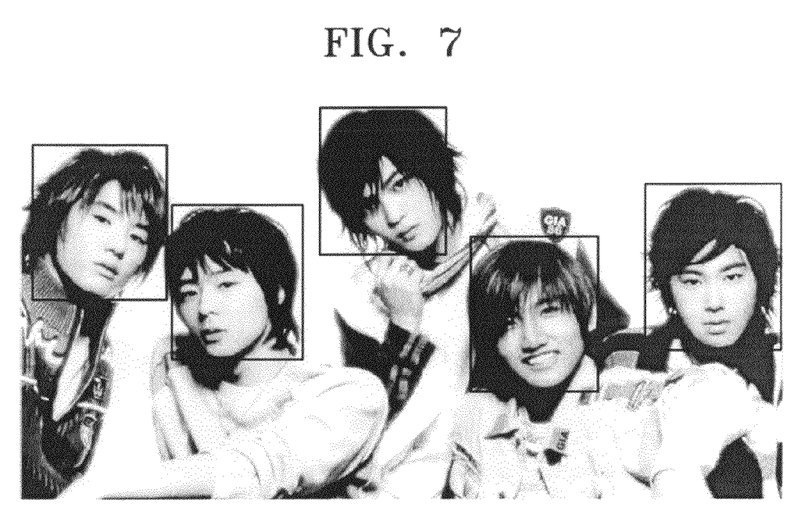
FIG. 7 is a photograph taken in an AF bracket mode by using the face recognition function of the digital photographing apparatus shown FIG. 5 according to an embodiment of the present invention.

The AF area setting unit 59-3 sets AF areas of which the number is the same as that of the faces detected by the face recognition unit 59-1 under the control of the control unit 53-3. FIG. 7 illustrates an example in which the AF area setting unit 59-3 sets five AF areas with respect to five faces detected by the face recognition unit 59-1.

The range finding unit 59-2 measures a distance between the digital photographing apparatus and a subject under the control of the control unit 59-4. The range finding unit 59-2 includes a light emitting unit (not shown) and a light receiving unit (not shown) so as to measure the distance. When AF areas are set, the light emitting unit illuminates the subject with infrared light by using an infrared light emitting diode (not shown), and the light receiving unit receives light bouncing off the subject. The range finding unit 59-2 measures the distance by receiving a signal corresponding to the received light.

Then, when the second shutter-release signal is input through the shutter-release button 31, the control unit 59-4 receives a distance measured by the range finding unit 59-2, controls operations so that focuses of all the AF areas are adjusted, and captures images of which the number is the same as that of the AF areas of which focuses are adjusted. In this case, when the digital photographing apparatus is set to a face photographing mode, and the control unit 59-4 operates so that the set focuses of the AF areas are adjusted so that images are captured in response to a single input through the shutter-release button 31.

For example, in FIG. 7, when the second shutter-release signal is input through the shutter-release button 31, the control unit 59-4 respectively adjusts focuses of five AF areas and captures and stores five images with respect to the AF areas of which focuses are adjusted.

Next, in another embodiment, the face recognition unit 59-1 detects face information such as the number of faces, positions of the faces, and the like in the display unit 43 from a real image to be taken. Since the face recognition unit 59-1 was described above in detail, the detailed description on the face recognition unit 59-1 will be omitted. In the second embodiment, the face recognition unit 59-1 uses the number of faces and distances between eyebrows obtained from the face information detected by the face recognition unit 59-1.

The face recognition unit 59-1 detects the face information such as the number of faces and positions of the faces including distances between eyebrows and outputs the face information to the control unit 59-4.

The control unit 59-4 controls the face recognition unit 59-1 so that the face recognition unit 59-1 receives the number of faces and the distances between eyebrows and sets faces having similar distances between eyebrows to an AF area. In this case, the similar distances between eyebrows indicate that distances between the digital photographing apparatus and subjects are similar and that the subjects belong to the same focus adjustment area.

The control unit 59-4 controls operations so that faces having similar distances between eyebrows is set to a single AF area and outputs the AF area to the AF area setting unit 59-3.

Figure 8:
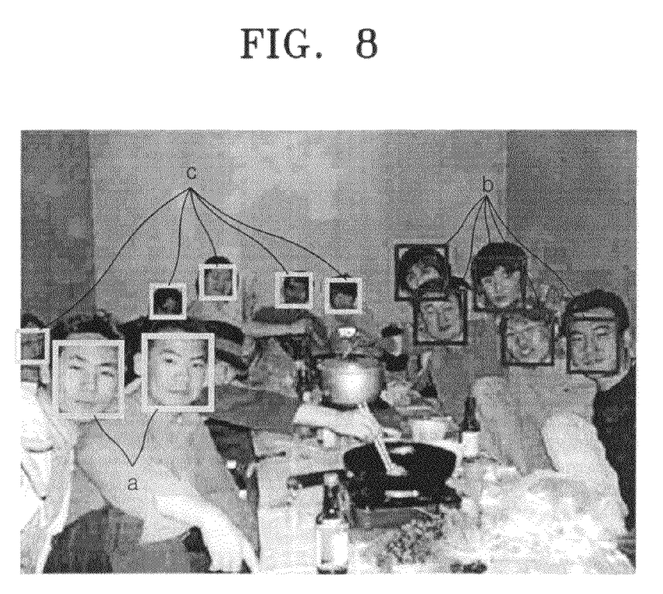
FIG. 8 is a photograph taken in an AF bracket mode by using the face recognition function of the digital photographing apparatus shown in FIG. 5 according to an embodiment of the present invention.

The AF area setting unit 59-3 sets faces having similar distances between eyebrows to a single AF area of the same group under the control of the control unit 53-3. FIG. 8 illustrates twelve faces detected by the face recognition unit 59-1 which are classified into an a-group, a b-group, and a c-group of AF areas having similar distances between eyebrows under the control of the control unit 59-4.

The range finding unit 59-2 measures a distance between the digital photographing apparatus and a subject under the control of the control unit 59-4. At this time, the range finding unit 59-2 measures a distance between the digital photographing apparatus and a representative face among AF areas of the same group which is set when measuring the distance. For example, in FIG. 8, the range finding unit 59-2 measures a distance between the digital photographing apparatus and a face included in the a-group, measures a distance between the digital photographing apparatus and a face included in the b-group, and measures a distance between the digital photographing apparatus and a face included in the c-group. Since a distance is measured between the digital photographing apparatus and a representative face in each group, it is possible to reduce a time taken to measure distances between the digital photographing apparatus and faces.

When the second shutter-release signal is input through the shutter-release button 31, the control unit 59-4 receives a distance measured by the range finding unit 59-2, controls operations so that focuses of the AF areas are adjusted, and captures images of which the number is the same as that of the AF areas of which focuses are adjusted. In this case, when the digital photographing apparatus is set to a face photographing mode, the control unit 59-4 operates so that the set focuses of the AF areas are adjusted so that images are captured in response to a single input through the shutter-release button 31.

For example, in FIG. 8, when the second shutter-release signal is input through the shutter-release button 31, the control unit 59-4 respectively adjusts focuses of AF areas of the a-group, the b-group, and the c-group and captures and stores three images with respect to the AF areas of which focuses are adjusted. That is, three images are captured and stored with respect to twelve faces.

Next, in the other embodiment, the face recognition unit 59-1 detects face information such as the number of faces, positions of the faces, and the like in the display unit 43 from a live view image to be taken. Since the face recognition unit 59-1 was described above in detail, the detailed description on the face recognition unit 59-1 will be omitted.

The face recognition unit 59-1 detects the face information such as the number of faces and positions of the faces and outputs the face information to the control unit 59-4.

The AF area setting unit 59-3 sets AF areas of which the number is the same as that of the faces detected by the face recognition unit 59-1 under a control of the control unit 53-3. FIG. 8 illustrates an example in which the AF area setting unit 59-3 sets twelve AF areas with respect to twelve faces detected by the face recognition unit 59-1.

The range finding unit 59-2 measures a distance from the digital photographing apparatus to a subject under the control of the control unit 59-4. Since the range finding unit 59-2 was described above in detail, the detailed description on the face recognition unit 59-1 will be omitted.

The control unit 59-4 operates so that faces having similar distances are set to AF areas belonging to the same group by receiving distances measured by the range finding unit 59-2. In this case, the similar measured distances indicate that the subjects have the same allowed depth, that is, the same focus adjustment area.

FIG. 8 illustrates twelve faces detected by the face recognition unit 59-1 which are classified into the a-group, the b-group, and the c-group of AF areas having similar distances between eyebrows under the control of the control unit 59-4.

When the second shutter-release signal is input through the shutter-release button 31, the control unit 59-4 receives a distance measured by the range finding unit 59-2, operates so that the same focus is applied to the AF areas belonging to the same group and captures images of which the number is the same as that of groups. In this case, when the digital photographing apparatus is set to the face photographing mode, the control unit 59-4 operates so that the same focus is applied to the AF areas belonging to the same group so that images of which the number is the same as that of groups are captured.

For example, in FIG. 8, when the second shutter-release signal is input through the shutter-release button 31, the control unit 59-4 respectively adjusts focuses of AF areas of the a-group, the b-group, and the c-group and captures and stores three images with respect to the AF areas of which focuses are adjusted. That is, three images are captured and stored with respect to twelve faces.

Figure 9:
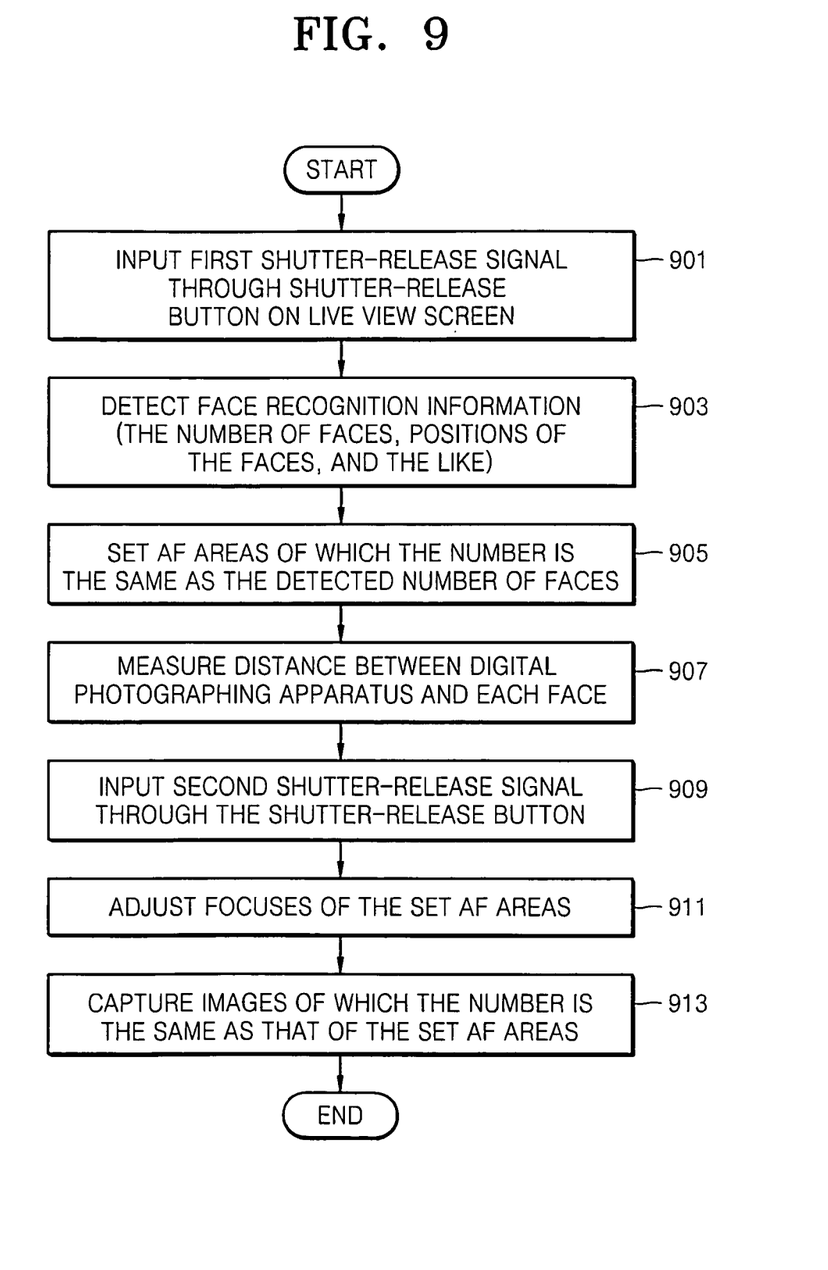
FIG. 9 is a flowchart of a photographing method using a face recognition method according to an embodiment of the present invention.
Figure 10:
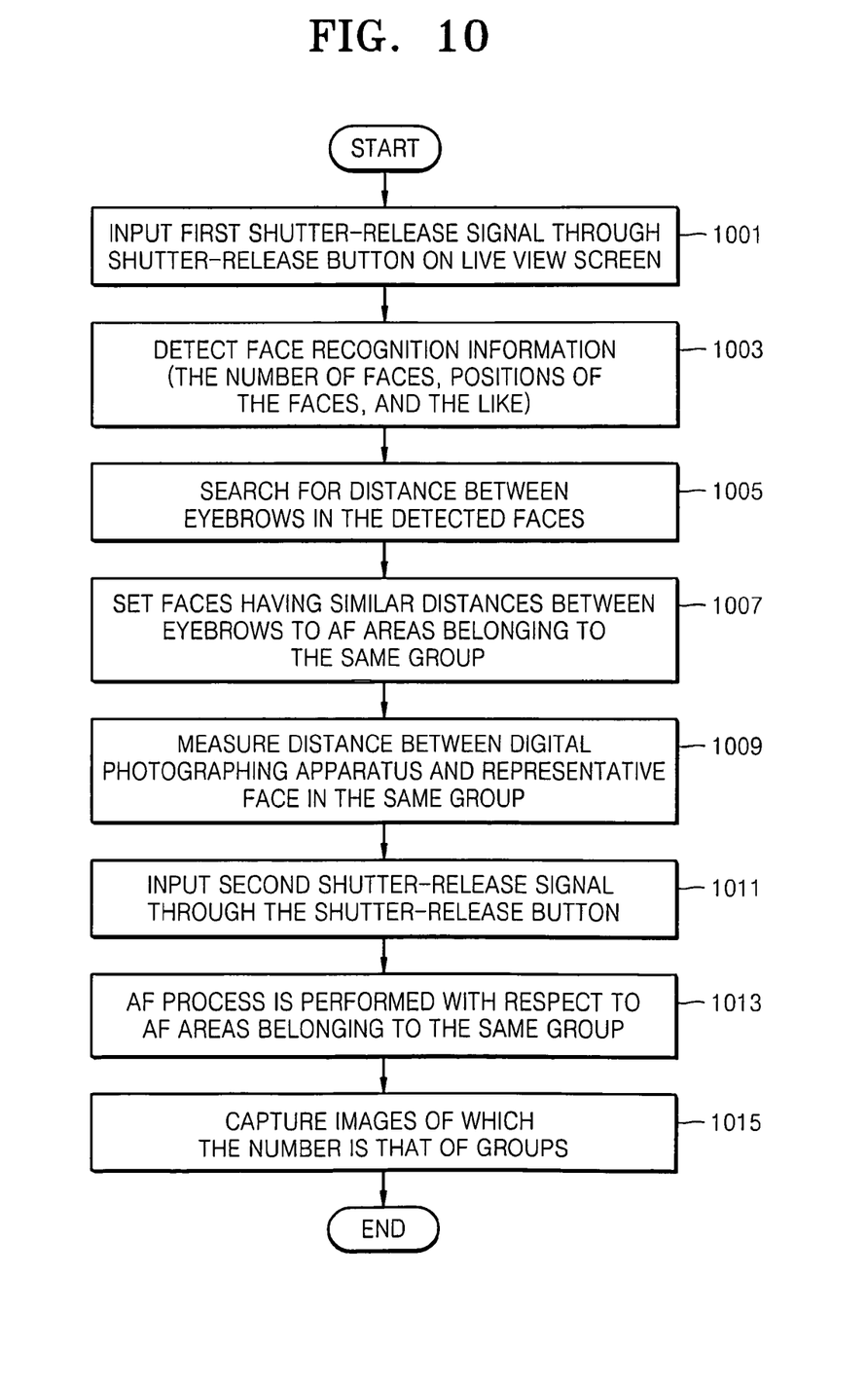
FIG. 10 is a flowchart of a photographing method using a face recognition method according to another embodiment of the present invention.
Figure 11:
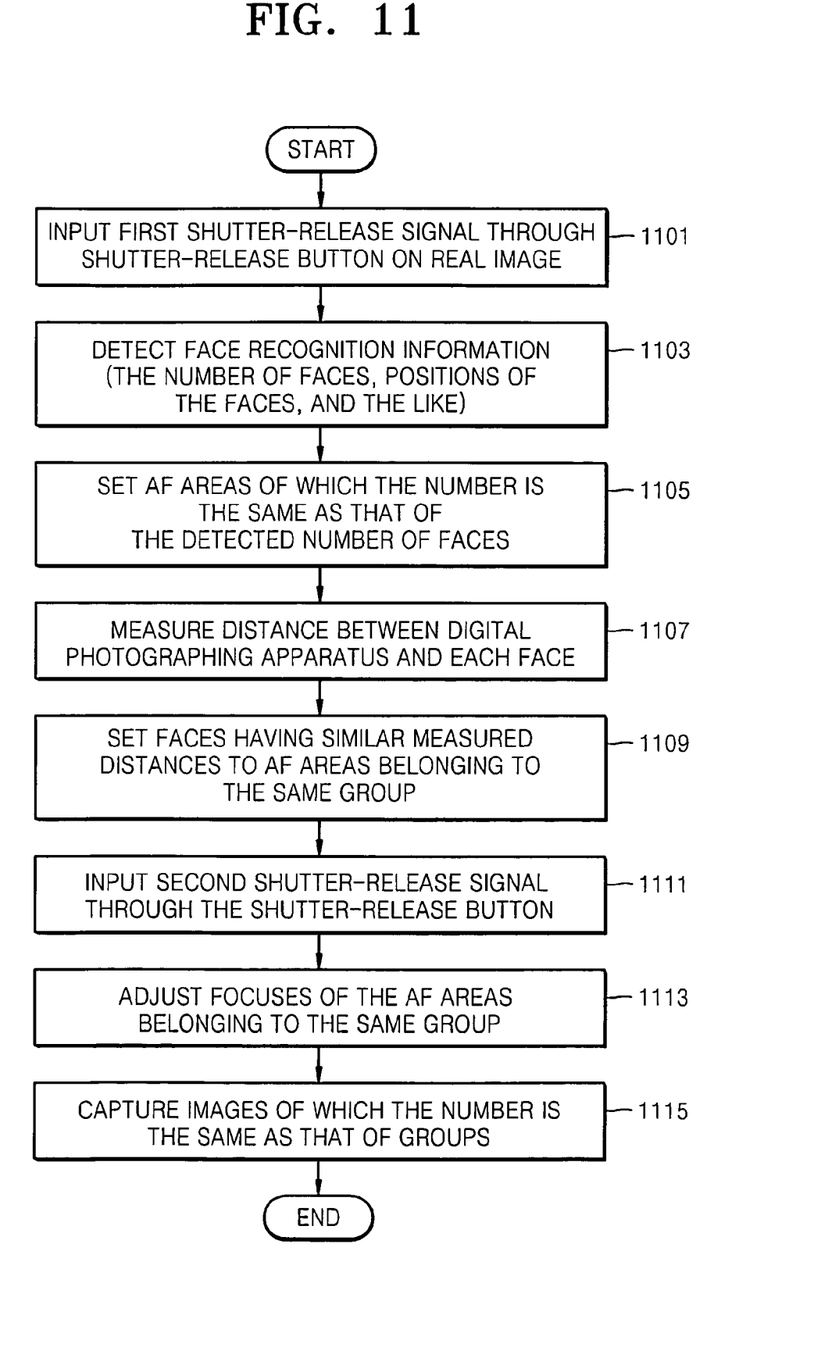
FIG. 11 is a flowchart of a photographing method using a face recognition method according to an embodiment of the present invention.

A photographing method using a face recognition function according to each of first to third embodiments of the present invention will be described with reference to FIGS. 9 to 11. The photographing method using the face recognition function according to an embodiment of the present invention may be performed in the image processing apparatus shown in FIG. 5. A main algorithm may be performed in the digital signal processing unit 59 in conjunction with peripheral components in the image processing apparatus.

First, the image processing method using the face recognition function according to an embodiment of the present invention will be described with reference to FIG. 9.

When a real image is displayed on the display unit 43, the first shutter-release signal is input through the shutter-release button 31 (operation 901). The first shutter-release signal is input so as to adjust focuses by recognizing faces and setting AF areas. Since this operation is automatically performed in a case where the digital photographing apparatus is set to the face photographing mode, it is unnecessary to input the first shutter-release signal through the shutter-release button 31 in this case.

When the first shutter-release signal is input through the shutter-release button 31, face information such as the number of faces, positions of the faces, and the like is detected from the live view image (operation 903). Since the face recognition unit 59-1 was described above in detail, the detailed description on the face recognition unit 59-1 will be omitted.

When the face information is completely detected by the face recognition unit 59-1, the AF area setting unit 59-3 sets AF areas of which the number is the same as that of the detected faces (operation 905). FIG. 7 illustrates an example in which the AF area setting unit 59-3 sets five AF areas with respect to five faces detected by the face recognition unit 59-1.

When the AF areas are completely set, the range finding unit 59-2 measures a distance between the digital photographing apparatus and a subject under a control of the control unit 59-4 (operation 907). Since the range finding unit 59-2 was described above in detail, the detailed description on the face recognition unit 59-1 will be omitted.

Then, when the second shutter-release signal is input through the shutter-release button 31 (operation 909), the control unit 59-4 receives a measured distance from the range finding unit 59-2, operates so that focuses of all the AF areas are adjusted (operation 911), and captures images of which the number is the same as that of the AF areas of which focuses are adjusted (operation 913). In this case, when the digital photographing apparatus is set to a face photographing mode, the control unit 59-4 operates so that the set focuses of the AF areas are adjusted so that images are captured in response to a single input through the shutter-release button 31. For example, in FIG. 7, when the second shutter-release signal is input through the shutter-release button 31, the control unit 59-4 respectively adjusts focuses of five AF areas and captures and stores five images with respect to the AF areas of which focuses are adjusted.

Next, the image processing method using the face recognition function according to another embodiment of the present invention will be described with reference to FIG. 10.

When a real image is displayed on the display unit 43, the first shutter-release signal is input through the shutter-release button 31 (operation 1001). The first shutter-release signal is input so as to adjust focuses by recognizing faces and setting AF areas. Since the operation is automatically performed in a case where the digital photographing apparatus is set to the face photographing mode, it is unnecessary to input the first shutter-release signal through the shutter-release button 31 in this case.

When the first shutter-release signal is input through the shutter-release button 31, face information such as the number of faces, positions of the faces, and the like is detected from the live view image (operation 1003). Since the face recognition unit 59-1 was described above in detail, the detailed description on the face recognition unit 59-1 will be omitted.

The control unit 59-4 detects the number of faces and distances between eyebrows from the face information detected by the face recognition unit 59-1 (operation 1005). It is possible to detect the distances between eyebrows from the positions of the faces detected by the face recognition unit 59-1.

The control unit 59-4 controls the AF area setting unit 59-3 so that the AF area setting unit 59-3 sets faces having similar distances between eyebrows to AF areas of the same group (operation 1007). In this case, the similar distances between eyebrows indicate that distances between the digital photographing apparatus and subjects are similar. FIG. 8 illustrates twelve faces detected by the face recognition unit 59-1 which are classified into the a-group, the b-group, and the c-group of AF areas having similar distances between eyebrows under a control of the control unit 59-4.

The range finding unit 59-2 measures a distance between the digital photographing apparatus and a representative face in an AF area of the same group under the control of the control unit 59-4 (operation 1009). For example, in FIG. 8, the range finding unit 59-2 measures a distance between the digital photographing apparatus and a face included in the a-group, measures a distance between the digital photographing apparatus and a face included in the b-group, and measures a distance between the digital photographing apparatus and a face included in the c-group. Since a distance is measured between the digital photographing apparatus and a representative face in each group, it is possible to reduce a time taken to measure distances between the digital photographing apparatus and faces.

When the second shutter-release signal is input through the shutter-release button 31 (operation 1011), the control unit 59-4 receives a distance measured by the range finding unit 59-2, operates so that the same focus is applied to the AF areas belonging to the same group (operation 1013) and captures images of which the number is the same as that of groups (operation 1015). Here, when the digital photographing apparatus is set to the face photographing mode, the control unit 59-4 operates so that the same focus is applied to the AF areas belonging to the same group so that images of which the number is the same as that of groups are captured.

For example, in FIG. 8, when the second shutter-release signal is input through the shutter-release button 31, the control unit 59-4 respectively adjusts focuses of AF areas of the a-group, the b-group, and the c-group and captures and stores three images with respect to the AF areas of which focuses are adjusted. That is, three images are captured and stored with respect to twelve faces.

Next, the image processing method using the face recognition function according to another embodiment of the present invention will be described with reference to FIG. 11.

When a real image is displayed on the display unit 43, the first shutter-release signal is input through the shutter-release button 31 (operation 1101). The first shutter-release signal is input so as to adjust focuses by recognizing faces and setting AF areas. Since the operation is automatically performed in a case where the digital photographing apparatus is set to the face photographing mode, it is unnecessary to input the first shutter-release signal through the shutter-release button 31 in this case.

When the first shutter-release signal is input through the shutter-release button 31, face information such as the number of faces, positions of the faces, and the like is detected from the live view image (operation 1103). Since the face recognition unit 59-1 was described above in detail, the detailed description on the face recognition unit 59-1 will be omitted.

When the face information is completely detected by the face recognition unit 59-1, the AF area setting unit 59-3 sets AF areas of which the number is the same as that of the detected faces (operation 1105). FIG. 8 illustrates an example in which the AF area setting unit 59-3 sets twelve AF areas with respect to twelve faces detected by the face recognition unit 59-1.

When the AF areas are completely set, the range finding unit 59-2 measures a distance between the digital photographing apparatus and a subject under the control of the control unit 59-4 (operation 1107). Since the range finding unit 59-2 was described above in detail, the detailed description on the face recognition unit 59-1 will be omitted.

The control unit 59-4 operates so that faces having similar distances are set to AF areas belonging to the same group by receiving distances measured by the range finding unit 59-2 (operation 1109). In this case, the similar measured distances indicate that the subjects have the same allowed depth, that is, the same focus adjustment area. FIG. 8 illustrates twelve faces detected by the face recognition unit 59-1 which are classified into the a-group, the b-group, and the c-group of AF areas having similar distances between eyebrows under a control of the control unit 59-4.

When the second shutter-release signal is input through the shutter-release button 31 (operation 1111), the control unit 59-4 receives a distance measured by the range finding unit 59-2, operates so that the same focus is applied to the AF areas belonging to the same group (operation 1113) and captures images of which the number is the same as that of groups (operation 1115). In this case, when the digital photographing apparatus is set to the face photographing mode, the control unit 59-4 operates so that the same focus is applied to the AF areas belonging to the same group and so that images of which the number is the same as that of groups are captured. For example, in FIG. 8, when the second shutter-release signal is input through the shutter-release button 31, the control unit 59-4 respectively adjusts focuses of AF areas of the a-group, the b-group, and the c-group and captures and stores three images with respect to the AF areas of which focuses are adjusted. That is, three images are captured and stored with respect to twelve faces.

As described above, in the present invention, it is possible to set AF areas in a plurality of faces recognized through a face recognition process and obtain an image in which all the faces are focused by photographing the faces in a bracket mode based on the set AF areas.

In addition, it is possible to reduce the storage space of a memory card by reducing the number of photographing processes in a bracket mode by applying the same focus to persons who are separated from the digital photographing apparatus at similar distances.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A digital photographing apparatus comprising:
    an image sensing unit to sense an image of a scene;
    a face recognition unit to detect a plurality of faces in the image of the scene;
    an autofocus area setting unit to set a plurality of focus areas for the image of the scene, wherein the plurality of focus areas respectively corresponds to the plurality of faces detected in the image of the scene, and the plurality of focus areas comprises at least a first focus area and a second focus area; and
    a control unit, in response to a single input of a shutter signal, to
        automatically adjust focus for the first focus area and control the image sensing unit to automatically capture a first still image that corresponds to the first focus area, and
        automatically adjust focus for the second focus area and control the image sensing unit to automatically capture a second still image that corresponds to the second focus area.

2. The digital photographing apparatus of claim 1, wherein the autofocus area setting unit is configured to set a same number of focus areas as a number of faces in the image.

3. The digital photographing apparatus of claim 1, further comprising:
    a range finding unit to measure the distance between each face and the digital photographing apparatus, wherein
    assigning the plurality of faces to focus groups based on their distances from the digital photographing apparatus.

4. The digital photographing apparatus of claim 1, wherein the image comprises a live image.

5. The digital photographing apparatus of claim 1 wherein the image comprises a still image.

6. The digital photographing apparatus of claim 4, further comprising:
    a range finding unit to measure a distance between each of the plurality of faces and the digital photographing apparatus.

7. The digital photographing apparatus of claim 6, wherein the control unit is configured to adjust the focus of each focus area based on the distance measured by the range finding unit.

8. The digital photographing apparatus as claimed in claim 1 further comprising a display unit to display the image of the scene and the plurality of focus areas on the image displayed on a display screen of the display unit, wherein the plurality of still images collectively cover the scene including the plurality of focus areas, and wherein each of the plurality of still images contains at least a part of a respective focus area of the plurality of focus areas.

9. A digital photographing apparatus comprising:
    a face recognition unit to detect face information in an image, the face information corresponding to a plurality of faces in the image;
    an autofocus area setting unit to set a plurality of focus areas based on the face information, to assign at least two focus areas to a focus area group, and to set at least a first focus area group and a second focus area group; and
    a control unit, in response to a single input of a shutter signal, to
        automatically adjust focus for the first focus area group and automatically capture a first still image that corresponds to the first focus area group, and
        automatically adjust focus for the second focus area group and automatically capture a second still image that corresponds to the second focus area group.

10. The digital photographing apparatus of claim 9, wherein each face has eyebrows and each focus area includes faces with similar distances between the eyebrows.

11. The digital photographing apparatus of claim 10, further comprising:

a range finding unit to measure a distance between exactly one face in the focus area group and the digital photographing apparatus.

12. The digital photographing apparatus of claim 9, further comprising:

a range finding unit to measure a distance between a face in the focus area group and the digital photographing apparatus, wherein the control unit is configured to adjust the focus of the focus area group based on the distance measured by the range finding unit.

13. The digital photographing apparatus of claim 9, wherein focus areas including faces at similar distances from the digital photographing apparatus are assigned to a same focus area group.

14. A method of operating a digital photographing apparatus comprising:

detecting face information corresponding to a plurality of faces in an image;

setting a plurality of focus areas based on the detected face information, wherein the plurality of focus areas comprises at least a first focus area and a second focus area;

in response to a single input of a shutter signal:

automatically adjusting focus for the first focus area and automatically capturing a first still image that corresponds to the first focus area; and automatically adjusting focus for the second focus are and automatically capturing a second still image that corresponds to the second focus area.

15. The method of claim 14, wherein each face has eyebrows and focus areas including faces having similar distances between the eyebrows are grouped together.

16. The method of claim 14, wherein focus areas including faces at similar distances from the digital photographing apparatus are grouped together.

17. The method of claim 14, wherein each focus area includes exactly one face.

18. A non-transitory computer-readable storage medium storing instructions that, when executed, cause a processor to at least carry out the method of claim 14.

19. A method of operating a digital photographing apparatus comprising:

detecting face information in a live image, the face information corresponding to a plurality of human faces;

setting a plurality of focus areas based on the face information and assigning each focus area to a focus area group;

setting at least a first focus area group and a second focus area group;

in response to a single input of a shutter signal:

automatically adjusting focus for the first focus area group and automatically capturing a first still image that corresponds to the first focus area group; and automatically adjusting focus for the second focus area group and capturing a second still image that corresponds to the second focus area group.

20. The method of claim 19, wherein each face has eyebrows and focus areas including faces with similar distances between the eyebrows are assigned to the same focus area group.

21. The method of claim 19, wherein the focus of each focus area group is adjusted based on a distance between a face in one of the focus areas in the focus area group and the digital photographing apparatus.

* * * * *